US010365859B2

(12) United States Patent
Camp et al.

(10) Patent No.: US 10,365,859 B2
(45) Date of Patent: Jul. 30, 2019

(54) STORAGE ARRAY MANAGEMENT EMPLOYING A MERGED BACKGROUND MANAGEMENT PROCESS

(71) Applicant: INTERNATIONAL BUSINESS MACHINES CORPORATION, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Roman A. Pletka, Zurich (CH); Lincoln T. Simmons, Houston, TX (US); Sasa Tomic, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 14/520,034

(22) Filed: Oct. 21, 2014

(65) Prior Publication Data
US 2016/0110248 A1 Apr. 21, 2016

(51) Int. Cl.
G06F 3/06 (2006.01)
G06F 11/10 (2006.01)

(52) U.S. Cl.
CPC .......... G06F 3/0688 (2013.01); G06F 3/0604 (2013.01); G06F 3/064 (2013.01);
(Continued)

(58) Field of Classification Search
CPC .......... G06F 3/0653; G06F 2212/7211; G06F 3/064; G06F 3/0604; G06F 11/1008
See application file for complete search history.

(56) References Cited

U.S. PATENT DOCUMENTS 5,559,956 A 9/1996 Sukegawa
5,905,993 A 5/1999 Shinohara
(Continued)

FOREIGN PATENT DOCUMENTS

CN 101325089 A 12/2008
CN 101325089 B 11/2012
(Continued)

OTHER PUBLICATIONS

International Business Machines Corporation (IBM), International Application No. PCT/JP2014/005371, International Filing Date: Oct. 22, 2014, International Search Report and Written Opinion dated Dec. 16, 2014.

(Continued)

Primary Examiner — Ann J Lo
Assistant Examiner — Masud K Khan
(74) Attorney, Agent, or Firm — Brian F. Russell; Robert Sullivan

(57) ABSTRACT

In at least one embodiment, a controller of a non-volatile memory array iteratively performs a merged background management process independently of any host system's demand requests targeting the memory array. During an iteration of the merged background management process, the controller performs a read sweep by reading data from each of a plurality of page groups within the memory array and recording page group error statistics regarding errors detected by the reading for each page group, where each page group is formed of a respective set of one or more physical pages of storage in the memory array. During the iteration of the merged background management process, the controller employs the page group error statistics recorded during the read sweep in another background management function.

25 Claims, 10 Drawing Sheets

(52) U.S. Cl.
CPC ........ *G06F 3/0653* (2013.01); *G06F 11/1008* (2013.01); *G06F 11/108* (2013.01); *G06F 2212/7211* (2013.01)

(56) References Cited

U.S. PATENT DOCUMENTS

| | | | |
|---|---|---|---|
| 6,553,104 | B1 | 4/2003 | Haefliger |
| 7,424,666 | B2 | 9/2008 | Chandwani et al. |
| 7,545,677 | B2 | 6/2009 | Lee et al. |
| 7,649,782 | B2 | 1/2010 | Eguchi et al. |
| 7,986,560 | B2 | 7/2011 | Park et al. |
| 8,116,141 | B2 | 2/2012 | Yoo et al. |
| 8,281,220 | B2 | 8/2012 | Kitahara |
| 8,296,620 | B2 | 10/2012 | Chen et al. |
| 8,356,216 | B2 | 1/2013 | Radke et al. |
| 8,447,919 | B1 | 5/2013 | Agarwal et al. |
| 8,527,819 | B2 | 9/2013 | Shalvi et al. |
| 8,601,313 | B1 | 12/2013 | Horn |
| 9,075,705 | B2 | 7/2015 | Hikichi |
| 2004/0083335 | A1* | 4/2004 | Gonzalez ............ G06F 12/0246 711/103 |
| 2005/0264910 | A1* | 12/2005 | Lee ........................ G06F 3/061 360/69 |
| 2006/0200299 | A1 | 9/2006 | Torno et al. |
| 2007/0180328 | A1 | 8/2007 | Cornwell et al. |
| 2008/0123419 | A1 | 5/2008 | Brandman et al. |
| 2008/0192544 | A1 | 8/2008 | Berman et al. |
| 2009/0003073 | A1 | 1/2009 | Rizel et al. |
| 2009/0070654 | A1 | 3/2009 | Flachs et al. |
| 2009/0141563 | A1 | 6/2009 | Furnemont |
| 2009/0323423 | A1 | 12/2009 | Bloom et al. |
| 2010/0046302 | A1* | 2/2010 | Ogura ..................... G11C 7/04 365/185.21 |
| 2010/0064096 | A1 | 3/2010 | Weingarten et al. |
| 2010/0251075 | A1 | 9/2010 | Takahashi et al. |
| 2010/0257429 | A1 | 10/2010 | Noguchi |
| 2011/0041039 | A1 | 2/2011 | Harari et al. |
| 2011/0238890 | A1 | 9/2011 | Toshiba |
| 2012/0198128 | A1 | 8/2012 | Van Aken |
| 2012/0226963 | A1 | 9/2012 | Bivens et al. |
| 2012/0239858 | A1 | 9/2012 | Melik-Martirosian |
| 2012/0239991 | A1 | 9/2012 | Melik-Martirosian |
| 2012/0246540 | A1 | 9/2012 | Lee et al. |
| 2012/0250415 | A1 | 10/2012 | Sharon et al. |
| 2012/0278651 | A1 | 11/2012 | Muralimanohar et al. |
| 2012/0284587 | A1 | 11/2012 | Yu et al. |
| 2012/0311271 | A1 | 12/2012 | Klein et al. |
| 2012/0324299 | A1 | 12/2012 | Moshayedi |
| 2012/0331207 | A1 | 12/2012 | Lassa et al. |
| 2013/0073786 | A1 | 3/2013 | Belgal et al. |
| 2013/0094286 | A1 | 4/2013 | Sridharan et al. |
| 2013/0111298 | A1 | 5/2013 | Seroff et al. |
| 2013/0124931 | A1 | 5/2013 | Chen |
| 2013/0145079 | A1 | 6/2013 | Lee et al. |
| 2013/0194865 | A1 | 8/2013 | Bandic et al. |
| 2013/0215682 | A1 | 8/2013 | Yang |
| 2013/0227200 | A1 | 8/2013 | Cometti et al. |
| 2013/0294184 | A1 | 11/2013 | Yang et al. |
| 2013/0339574 | A1 | 12/2013 | Franceschini et al. |
| 2014/0029336 | A1 | 1/2014 | Venkitachalam et al. |
| 2014/0040664 | A1 | 2/2014 | Hida et al. |
| 2014/0059405 | A1 | 2/2014 | Syu et al. |
| 2014/0082440 | A1 | 3/2014 | Ho et al. |
| 2014/0089564 | A1 | 3/2014 | Liu et al. |
| 2014/0095110 | A1 | 4/2014 | Chen et al. |
| 2014/0115238 | A1 | 4/2014 | Xi et al. |
| 2014/0136927 | A1* | 5/2014 | Li ........................ G06F 11/1048 714/768 |
| 2014/0204672 | A1 | 7/2014 | Lee et al. |
| 2014/0208004 | A1 | 7/2014 | Cohen et al. |
| 2014/0208041 | A1 | 7/2014 | Hyde et al. |
| 2014/0226398 | A1 | 8/2014 | Desireddi et al. |
| 2015/0103593 | A1 | 4/2015 | Su |
| 2015/0154061 | A1 | 6/2015 | Camp et al. |
| 2015/0161034 | A1 | 6/2015 | Fisher |
| 2015/0161035 | A1 | 6/2015 | Fisher et al. |
| 2015/0161036 | A1 | 6/2015 | Camp et al. |
| 2015/0243363 | A1* | 8/2015 | Wu .................... G11C 11/5642 365/185.18 |
| 2015/0262712 | A1 | 9/2015 | Chen et al. |
| 2016/0110248 | A1 | 4/2016 | Camp et al. |
| 2016/0179412 | A1 | 6/2016 | Camp et al. |
| 2016/0179664 | A1 | 6/2016 | Camp et al. |

FOREIGN PATENT DOCUMENTS

| | | |
|---|---|---|
| EP | 1008936 A2 | 6/2000 |
| JP | 5-282880 A | 10/1993 |
| JP | 5203049 B2 | 6/2013 |
| KR | 20130088061 A | 8/2013 |
| WO | 2009114618 A2 | 9/2009 |

OTHER PUBLICATIONS

Russell Ng IPLLC, "List of IBM Patents or Patent Applications Treated as Related"; Mar. 3, 3015.

Hutsell, Woody et al., "Flash Solid-State Disk Reliability", TMS (Texas Memory Systems), Nov. 2008.

Hutsell, Woody, "An In-depth Look at the RamSan-500 Cached Flash Solid State Disk", TMS (Texas Memory Systems), Mar. 2008.

Hutsell, Woody, "An In-depth Look at the RamSan-620 Flash Solid State Disk", TMS (Texas Memory Systems), Jul. 2009.

Jung, Dawoon et al., "A Group-Based Wear-Leveling Algorithm for Large-Capacity Flash Memory Storage Systems", CASES'07, Sep. 30-Oct. 3, 2007.

Choi, In-Hwan et ai., "Wear Leveling for PCM Using Hot Data Identification", Proceedings of the International Conference on IT Convergence and Security 2011. Springer Netherlands, 2012.

Grupp, Laura M. et ai., "Characterizing Flash Memory: Anomalies, Observations, and Applications", MICRO'09, Dec. 12-16, 2009.

Chang, Li-Pin, "On Efficient Wear Leveling for Large-Scale Flash-Memory Storage Systems", SAC'07, Mar. 11-15, 2007.

Hsieh. Jen-Wei et al., "Efficient Identification of Hot Data for Flash Memory Storage Systems", ACM Transactions on Storage, vol. 2, No. 1, pp. 22-40, Feb. 2006.

Chang, Yuan-Hao et al., "Endurance Enhancement of Flash-Memory Storage Systems: An Efcient Static Wear Leveling Design", DAC 2007, Jun. 4-8, 2007.

Qureshi, Moinuddin K. et ai., "Enhancing Lifetime and Security of PCM-Based Main Memory with Start-Gap Wear Leveling", MICRO'09, Dec. 12-16, 2009.

Silverton Consulting, Inc., "IBM FlashSystem 840 RAS for better performance and data protection", StorInt Briefling, 2012.

Micheloni, R. et al., "Non-volatile memories for removable media", Proceedings of the IEEE, See pp. 152, 153 & 154, vol. 97, No. 1, Jan. 2009.

Cho, S. et al., "NAND reliability improvement with controller assisted algorithms in SSD", Flash Memory Summit, See pp. 13 & 17, Santa Clara, CA, Aug. 2013 http://www.flashmemorysummit.com/English/Collaterals/Proceedings/2013/20130814_E21_Cho.pdf.

Cai, Yu et al., "Threshold Voltage Distribution in MLC NAND Flash Memory: Characterization, Analysis, and Modeling", Department of Electrical and Computer Engineering, Carnegie Mellon University, Pittsburgh, PA, Date of Conference: Mar. 18-22, 2013.

Dong, G. et al., "Using Lifetime-Aware Progressive Programming to Improve SLC NAND Flash Memory Write Endurance", Date of Publication: Jul. 3, 2013 URL:http://ieeexplore.ieee.org/xpl/articleDetails.jsp?tp=&arnumber=6553104&sortType%3Ddesc_p_Publication_Year%26queryText%3DP%2FE+Cycles.

"Detecting Error Count Deviations for Non-Volatile Memory Blocks for Advanced Non-Volatile Memory Block Management", U.S. Appl. No. XX/XXX,XXX, filed Oct. 20, 2014.

H. Schmidt et al., "Heavy Ion SEE Studies on 4-Gbit NAND-Flash Memories", 2007 IEEE.

Stefano Gregori et al., "On-Chip Error Correcting Techniques for New-Generation Flash Memories", 2003 IEEE.

(56) References Cited

OTHER PUBLICATIONS ip.com, "Method of combined data retention and wear leveling scan for minimizing flash resource contention in flash based memory systems", IP.com No. IPCOM000229968D, IP.com Electronic Publication: Aug. 10, 2013.

Hu, Xiao-Yu, "Container Marking: Combining Data Placement, Garbage Collection and Wear Levelling for Flash", IBM Research, Zurich, Switzerland, IEEE Computer Society, 2011.

Wong et al., "Phase Change Memory," Proceedings of the IEEE, vol. 98, No. 12, Nov. 2012, pp. 2201-2227.

Ricco et al., "Nonvolatile Multilevel Memories for Digital Applications," Proceedings of the IEEE, vol. 86, No. 12, Dec. 1998, pp. 2399-2423.

Chien et al., "A Multi-Level 40nm WOx Resistive Memory with Excellent Reliability," Electron Devices Meeting (IEDM) 2011 IEEE International, Dec. 5-7, 2011, pp. 31.5.1-31.5.4.

Jimenez et al., Wear Unleveling: Improving NAND Flash Lifetime by Balancing Page Endurance,: 12th USENIX Conference on File and Storage Technologies, Feb. 17-20, 2014, pp. 47-59.

\* cited by examiner

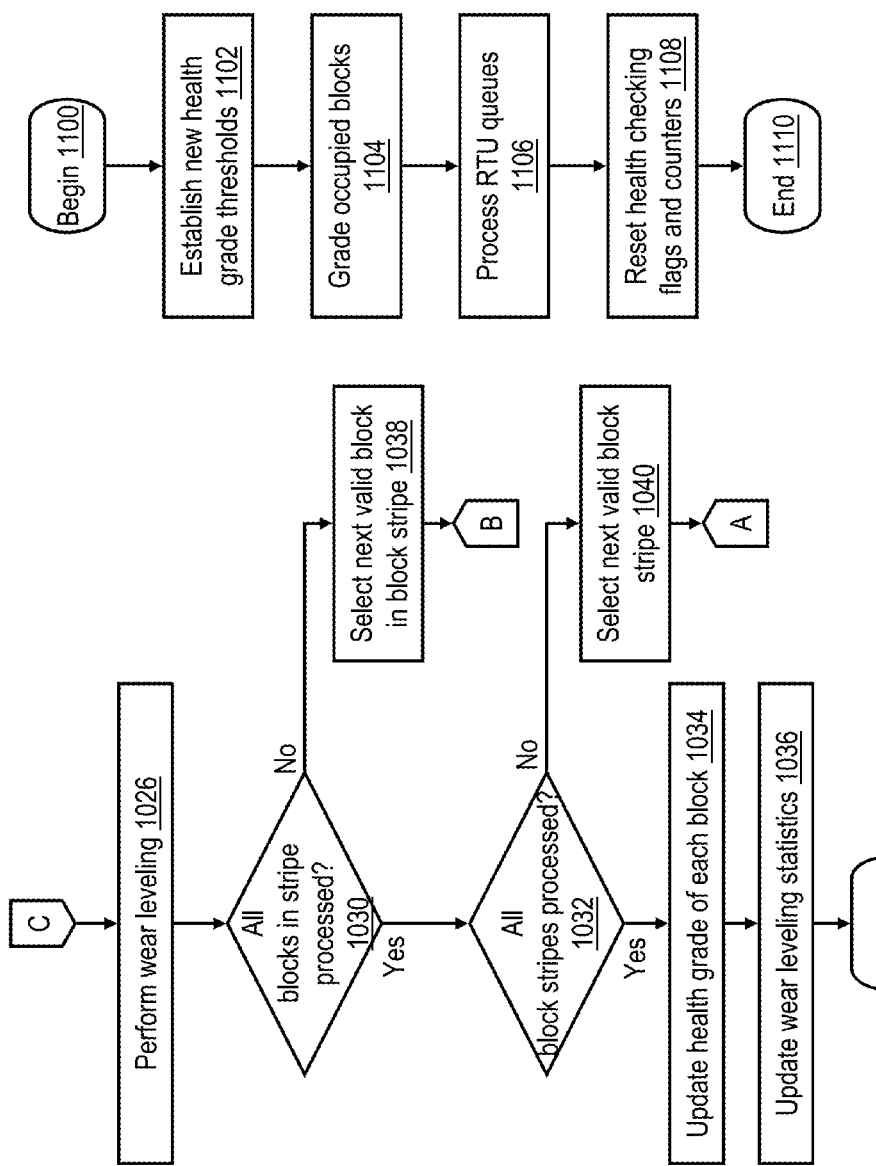

STORAGE ARRAY MANAGEMENT EMPLOYING A MERGED BACKGROUND MANAGEMENT PROCESS

BACKGROUND OF THE INVENTION

This disclosure relates to data processing and storage, and more specifically, to management of a data storage system, such as a flash memory system, utilizing a merged background management process.

Flash memory is a non-volatile memory technology that stores one or more bits of data per memory cell as a charge on the floating gate of a transistor. As is well known in the art, flash memory is inherently susceptible to bit errors, including program disturbs, read disturbs, retention errors (i.e., errors attributable to decay of the gate charge of programmed cells over time), and/or endurance errors (i.e., errors attributable to damage to the gate dielectric due to the number of cell program/erase (PE) cycles to which the cell is subjected). Consequently, data storage systems employing flash memory as a storage media generally implement multiple flash management functions to address the inherent error characteristics of flash memory. Existing systems commonly integrate at least some of these flash management functions into the data path (e.g., error correcting code (ECC) encoding and RAID-like data protection schemes), while other flash management functions operate in the background independently of any external requests for the data stored in the flash memory. Examples of background flash management functions common in enterprise-class flash arrays include read sweeping, which entails reading individual flash pages to detect bit errors, and wear leveling, which seeks to equalize the program/erase cycle counts for all flash pages.

As with other memory technologies, succeeding generations of flash memory achieve ever increasing cell densities, resulting in improved cost per byte of storage. However, the succeeding generations of flash memory are inherently more prone to bit errors due to the increased cell densities. Error rates tend to be even more aggravated in multi-level cell (MLC) and other flash technologies that store two or more bits of data per cell. Consequently, to achieve a given level of reliability, the number of discrete flash management functions and the processing required to perform the flash management functions tend to increase in each generation of flash memory.

BRIEF SUMMARY

The present disclosure recognizes that it would be desirable to be able to achieve increased efficiency in memory management processing without sacrificing system-level reliability. Accordingly, in at least one embodiment, a controller of a non-volatile memory array, such as a flash memory array, implements a merged background checking process to achieve processing and data efficiencies not available through the use of prior discrete memory management functions.

In at least one embodiment, a controller of a non-volatile memory array, such as a flash memory array, iteratively performs a merged background management process independently of any host system's demand requests targeting the memory array. During an iteration of the merged background management process, the controller performs a read sweep by reading data from each of a plurality of page groups within the memory array and recording page group error statistics regarding errors detected by the reading for each page group, where each page group is formed of a respective set of one or more physical pages of storage in the memory array. During the iteration of the merged background management process, the controller employs the page group error statistics recorded during the read sweep in another background management function.

BRIEF DESCRIPTION OF THE SEVERAL VIEWS OF THE DRAWINGS

FIGS. 10A-10B together form a high level logical flowchart of an exemplary process by which a flash controller performs background flash management in accordance with one embodiment;

FIG. 11 is a high level logical flowchart of an exemplary process by which a flash controller performs health grading in accordance with one embodiment.

DETAILED DESCRIPTION

Figure 1A:
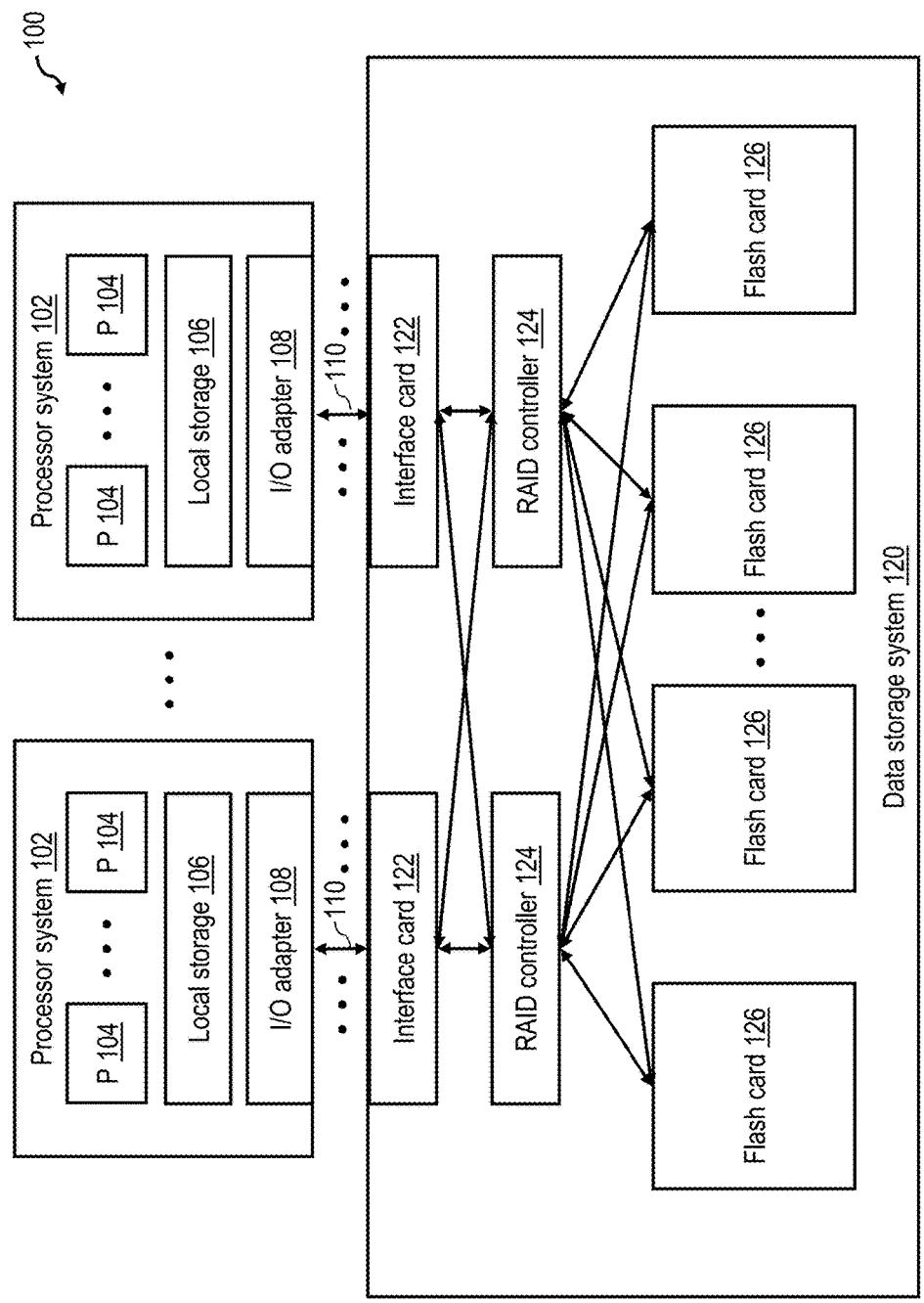
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. Processor system 102 may additionally include local storage 106 (e.g., dynamic random access memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER series available from International Business Machines Corporation), or a mainframe computer system. Processor system 102 can also be an embedded processor system using various processors such as ARM, PowerPC, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, I/O channel may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface cards 122 through which data storage system 120 receives and responds to input/output operations (IOP) 102 via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
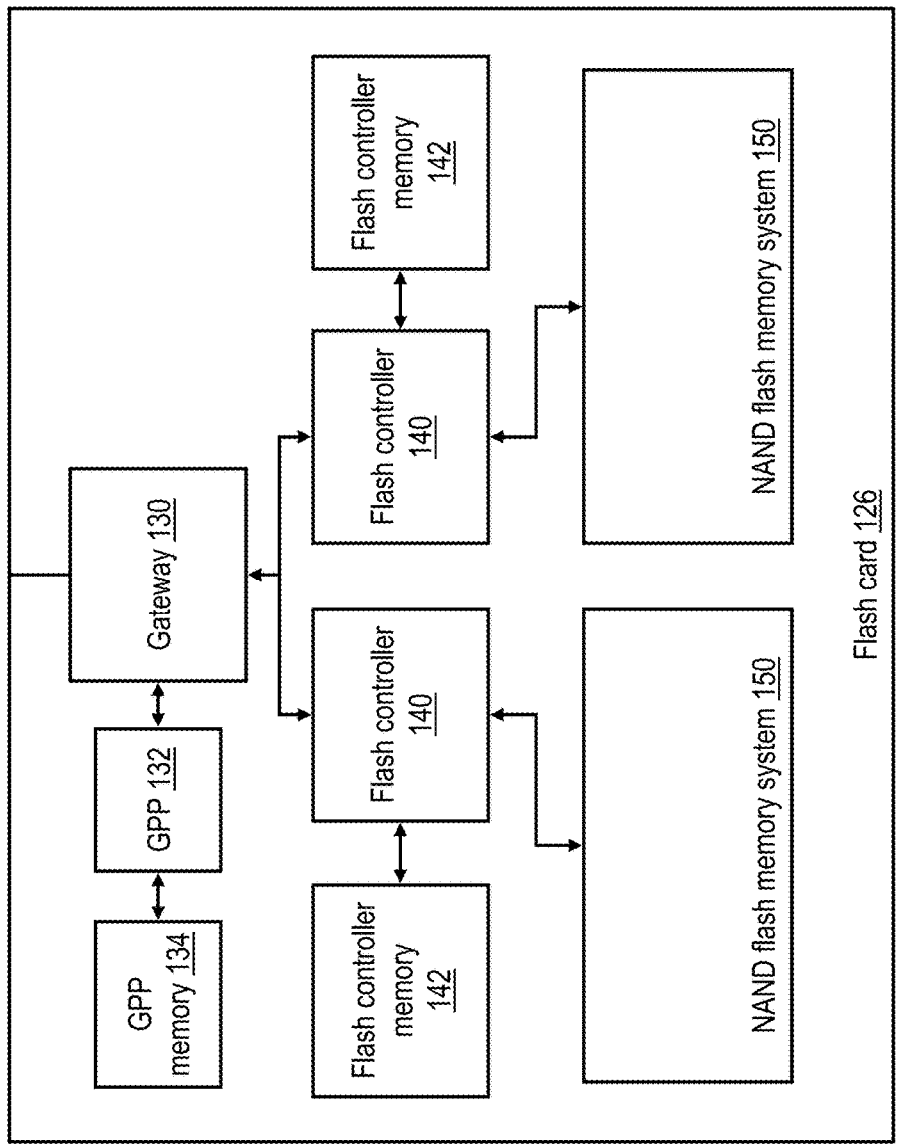
FIG. 1B is a more detailed block diagram of a flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on IOPs received by gateway 130 and/or to schedule servicing of the IOPs by flash card 126. GPP 132 is coupled to a GPP memory 134 (e.g., Dynamic Random Access Memory (DRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be stored to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the page typically having a size of 4 kilobytes. Therefore, more than one logical page may be stored in a physical flash page. The flash translation layer translates this LBA into a physical address assigned to a corresponding physical location in a NAND flash memory system 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
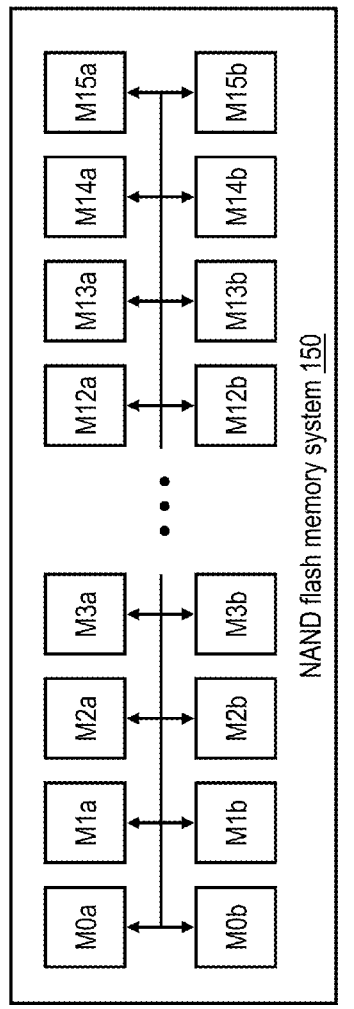
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module, for example, a Single Level Cell (SLC), Multi-Level Cell (MLC), Three Level Cell (TLC), or Quad Level Cell (QLC) NAND flash memory module. The thirty-two NAND flash memory modules are arranged in sixteen groups of two (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the memory modules corresponding to the individual lanes at, or very nearly at, the same time.

Figure 3:
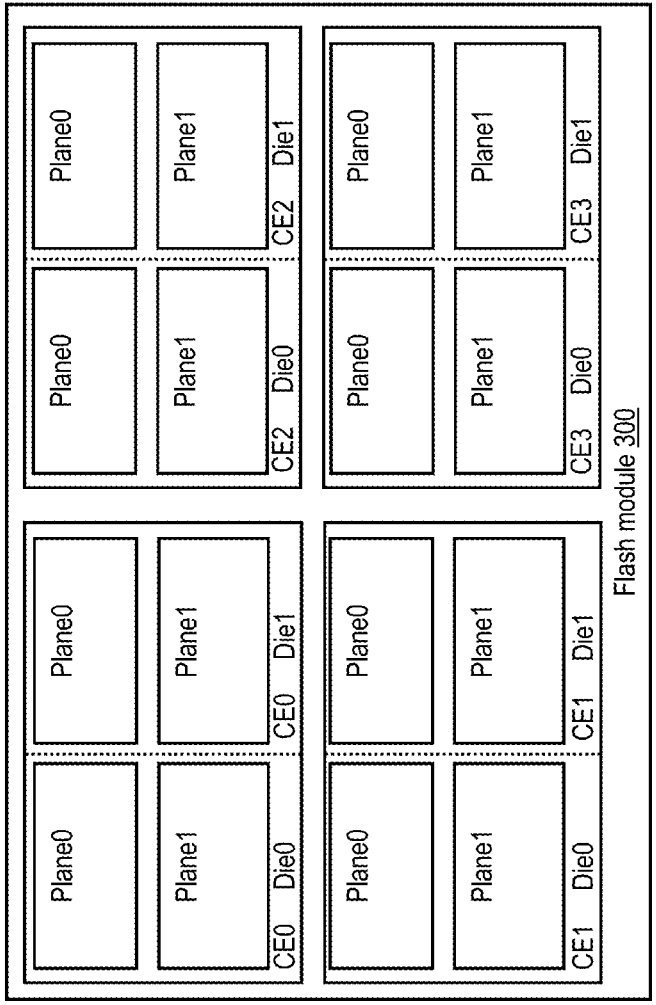

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
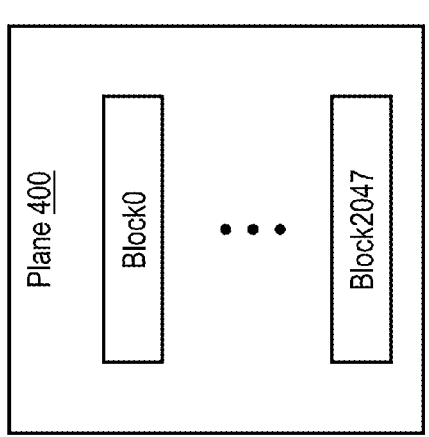
Figure 5:
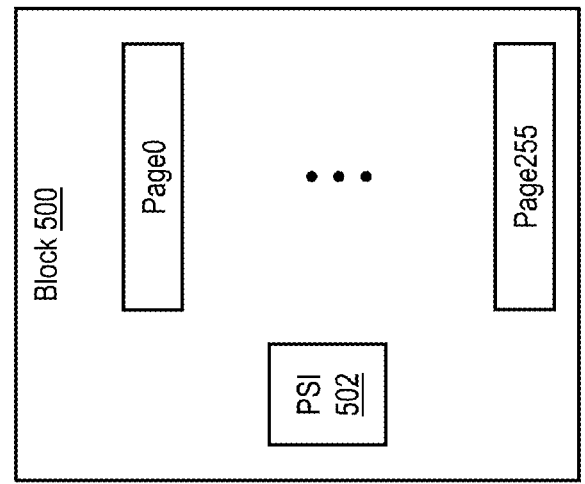

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add a some additional blocks as some blocks might fail early. In general, a block 500 is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis. As further shown in FIG. 5, each block 500 preferably includes page status information 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in a flash controller memory 142 and/or GPP memory 134).

Because the flash translation layer implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cycle Redundancy Check (CRC), and parity.

Figure 6A:
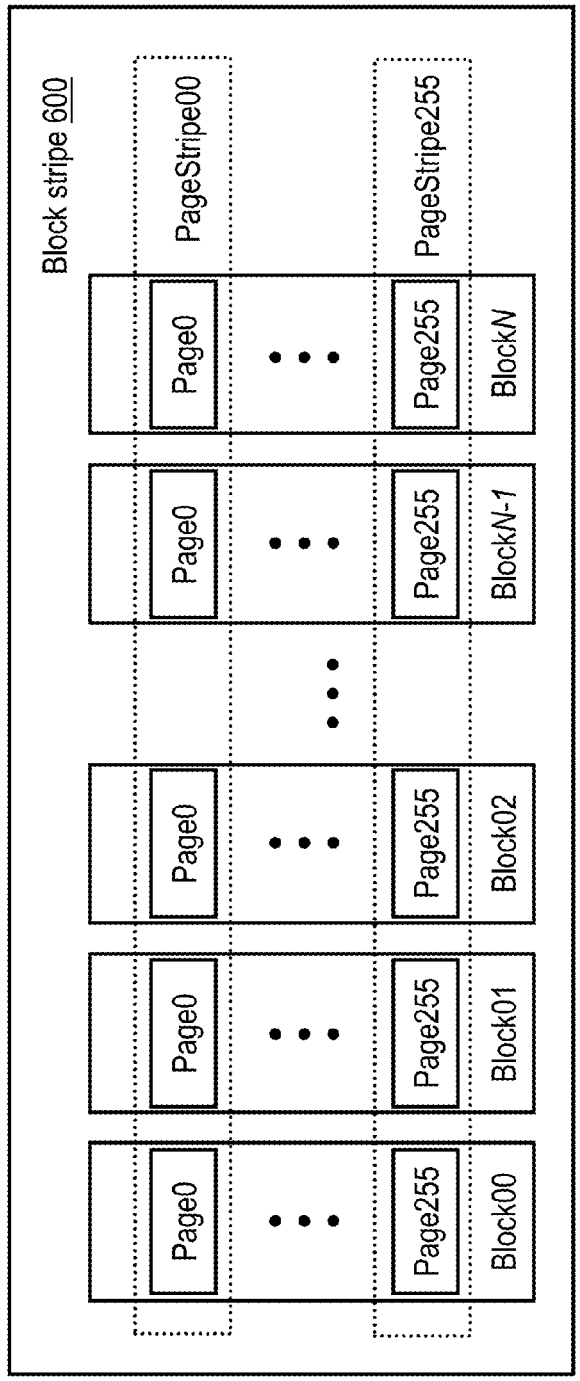
FIG. 6A depicts an exemplary implementation of a block stripe in accordance with the present disclosure.
Figure 6B:
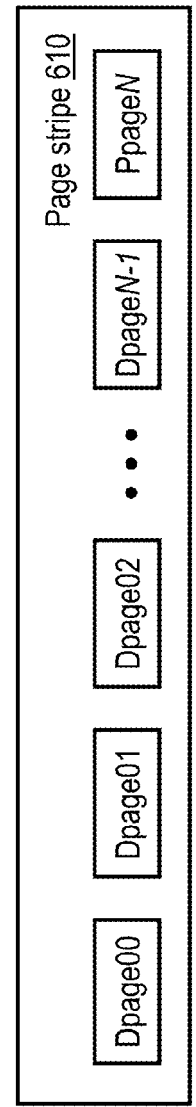
FIG. 6B depicts an exemplary implementation of a page stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a preferred embodiment, all pages of a page stripe are associated with different lanes to achieve high write bandwidth. Because in many implementations the smallest erase unit is a block, page stripes are grouped into a block stripe as is shown in FIG. 6A, where each block in the block stripe is associated to a different lane. When a block stripe is built, any free block of a lane can be chosen, but preferably all blocks should have the same or similar health grade. Note that the block selection can be further restricted to be from the same plane, die, and/or chip enable. Once a block from each lane has been picked, page stripes are preferably formed from pages with the same page number from all blocks in the block stripe. While the lengths of the various page stripes stored into NAND flash memory system 150 can and preferably do vary, in one embodiment each page stripe includes two to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe, but typically is on the same lane for all page stripes of the same block stripe to minimize meta-data information. The addition of a data protection page as illustrated requires that garbage collection be performed for all page stripes of the same block stripe at the same time. After garbage collection of the block stripe completes, the block stripe can be dissolved, and each block can be placed into the ready-to-use (RTU) queue as explained below.

Figures 7, 8:
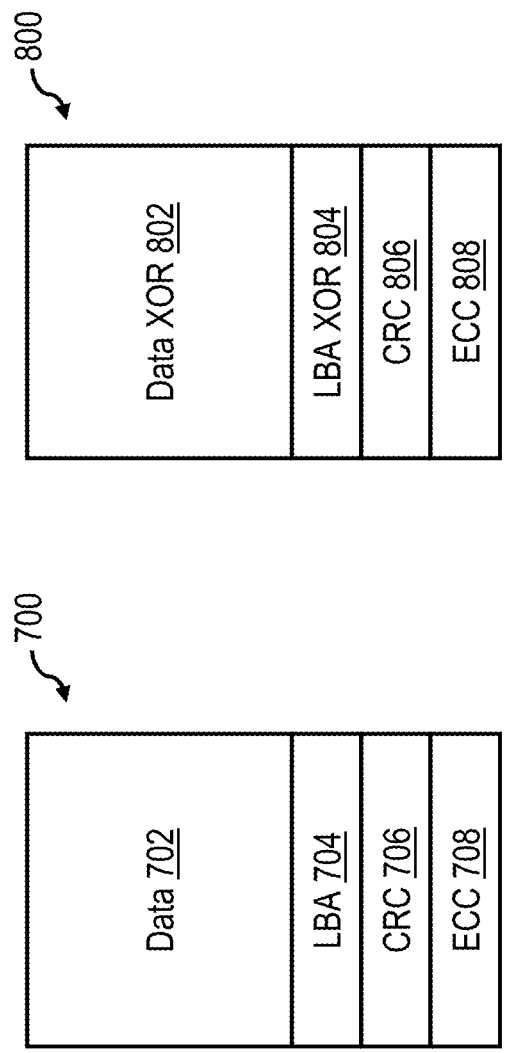
FIG. 7 illustrates an exemplary codeword stored in each data page in accordance with the present disclosure.
FIG. 8 depicts an exemplary codeword stored in each data protection page in accordance with the present disclosure.

FIG. 7 illustrates an exemplary format of a codeword stored in each data page within page stripe 610 of FIG. 6. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, these metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. Similarly, a positive integer number of codewords, are stored in each data protection page, but an alternative embodiment may also store a single codeword in a data protection page. In the depicted example, data protection codeword 800 includes a data XOR field 802 that contains the bit-by-bit Exclusive Or (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data page allows the correction of some number of bit errors within the flash page. Depending on the ECC method used it may be possible correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data page and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by a flash controller 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 maintains one RTU queue 906 per channel, and an identifier of each erased block that is to be reused is enqueued in the RTU queue 906 corresponding to its channel. A build block stripes function 920 performed by flash management code running on the GPP 132 constructs new block stripes for storing data and associated parity information from the erased blocks enqueued in RTU queues 906. A sweep count of each new block stripe is initialized to zero because the new block stripe has not yet been handled by a background health checker 930. The new block stripes are then queued to the flash controller 132 for data placement. As noted above with reference to FIG. 6A, block stripes are preferably formed of blocks residing in different channels, meaning that build block stripes function 920 can conveniently construct a block stripe by drawing each block of the new block stripe from a different RTU queue 906. In general, build block stripes function 920 attempts to construct stripes from blocks of approximately equal health (i.e., expected remaining useful life).

In response to write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured access frequency) of the LBA of the write data, as described, for example, in U.S. patent application Ser. No. 14/139,925, which is incorporated herein by reference in its entirety. Data placement function 910 then writes the write data, associated metadata (e.g., CRC and ECC values), and parity information for the page stripe in the allocated page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the data held in block stripes enqueued in relocation queue 904. To relocate such data, relocation function 914 updates LPT table 900 to remove the current association between the logical and physical addresses of the data. In addition, relocation function 914 issues relocation write requests to data placement function 910 to request that the data of the old block stripe be written to a new block stripe in NAND flash memory system 150. Once all still valid data has been moved from the old block stripe, the old block stripe is passed to dissolve block stripes function 916, which decomposes the old block stripe into its constituent blocks, thus disassociating the blocks. Each of the blocks formerly forming the dissolved block stripe is then erased. Based on the health metrics of each erased block, each erased block is either retired (i.e., withdrawn from use) by a block retirement function 918 among the flash management functions executed on GPP 132, or alternatively, prepared for reuse by placing the block on the appropriate ready-to-use (RTU) queue 906 in the associated GPP memory 134.

Figure 9:
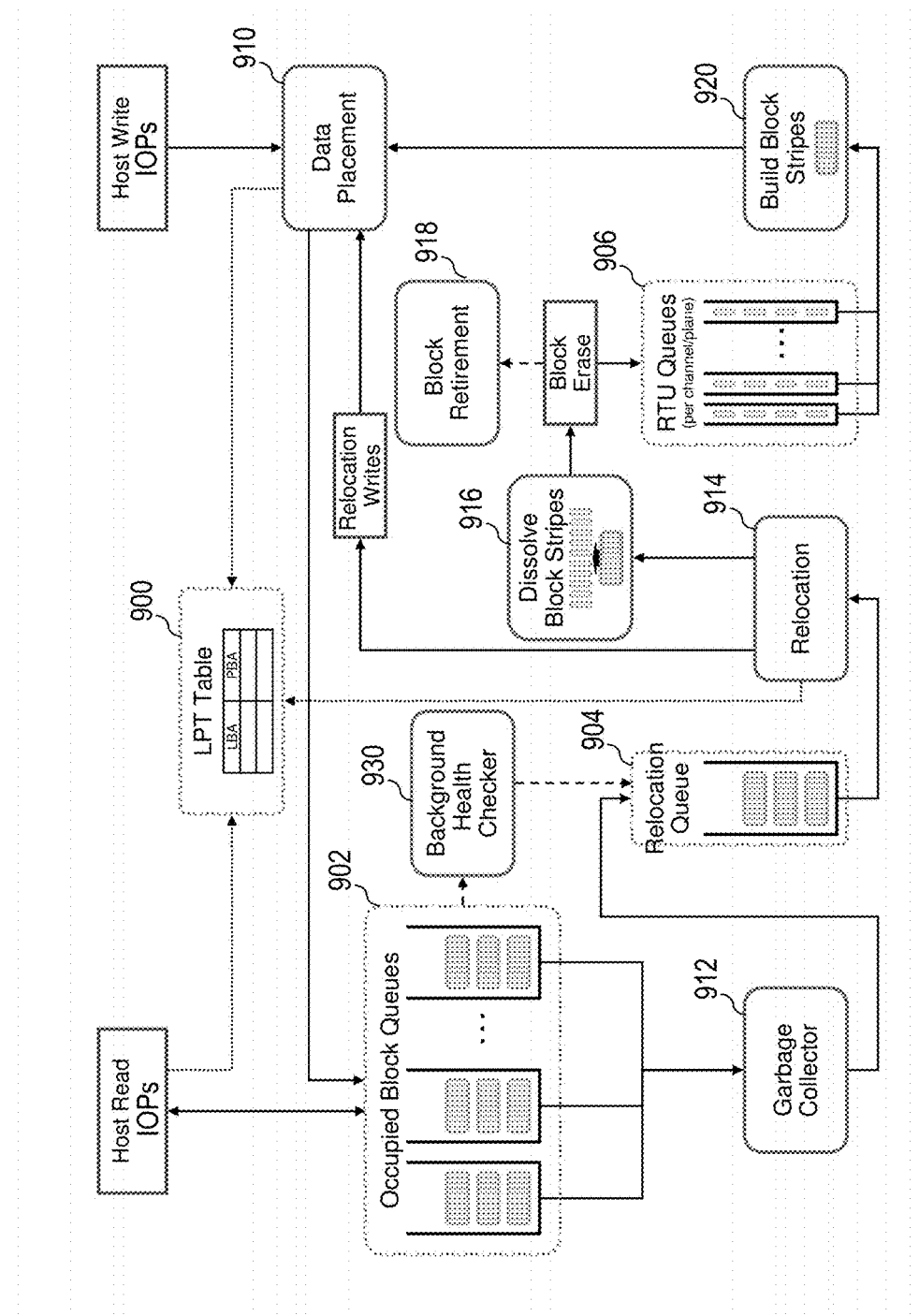
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more metrics of health for blocks belonging to block stripes recorded in occupied block queues 902. Based on the one or more of the health metrics, background health checker 930 places block stripes on relocation queue 904 for handling by relocation function 914.

Figure 10A:
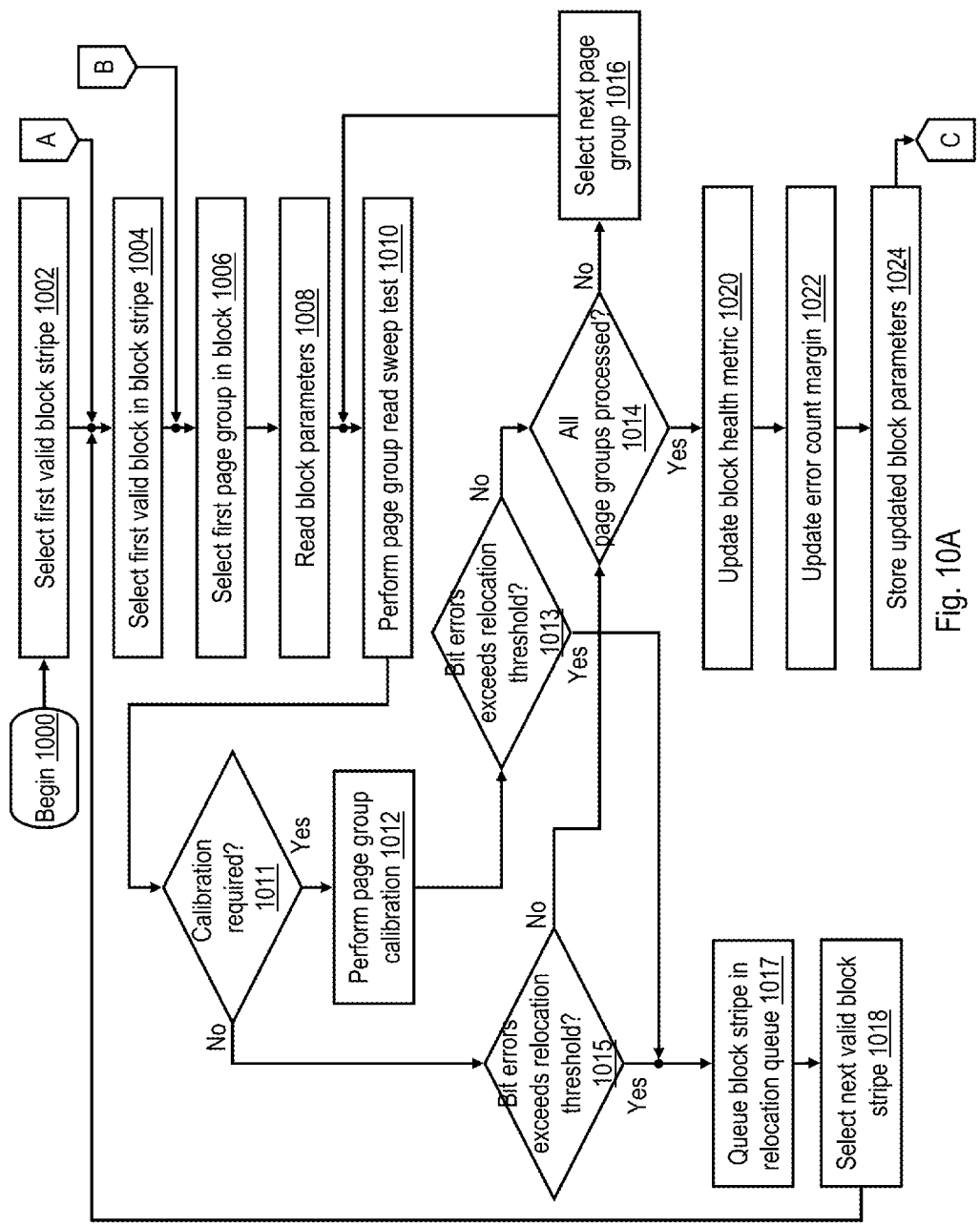

Referring now to FIGS. 10A-10B, there is depicted a high level logical flowchart of an exemplary process by which background flash management is performed in accordance with one embodiment. The illustrated process may be performed, for example, by background health checker 930 of flash controller 140 and/or GPP 132 in hardware, firmware, software or a combination thereof. For simplicity of explanation, it will hereafter be assumed that the process is performed by background health checker 930 executing on GPP 132. As with the other logical flowcharts presented herein, operations are presented in logical rather than strictly chronological order, and in some embodiments, operations can be performed in a different order than presented or concurrently. The described process merges into one process multiple different flash management functions in order to achieve enhanced data and processing efficiency.

The background flash management process begins at block 1000 and then proceeds to block 1002, which depicts background health checker 930 selecting a first valid block stripe from occupied block queues 902. Background health checker 930 then selects a first valid block in the selected block stripe (block 1004) and a first page group in the selected block (block 1006). In at least one embodiment, the page group selected at block 1006 is a possibly non-contiguous group of pages within the same memory block. Hence, traversal of page stripes may not be in contiguous ascending sequence as is done in prior art. For example, in the embodiment of FIG. 6A in which each block comprises 256 pages, a page group may include approximately sixteen valid pages of the block. In some embodiments, the page group can be formed arbitrarily, for example, by taking the valid pages from a set formed of each sixteenth page of the block. More preferably, each page group is formed of valid pages in the block that have similar health and/or similar read threshold voltage shift values (as described below).

It should be noted that in the disclosed embodiment, background health checker 930 periodically loops over all valid block stripes, but does not process erased blocks within RTU queues 906. In an alternate embodiment, background health checker 930 can be configured to alternatively iterate over all blocks (i.e., both valid blocks and erased blocks) rather than only valid block stripes. In this embodiment, however, counters and other metadata must be maintained per-block, thus increasing the amount of metadata that must be kept to perform health checking. In addition, those skilled in the art will appreciate that some of the functions of the background health checker 930 might not be executed on erased blocks.

It should also be noted that the illustrated embodiment of the process iterates through each block page-group-by-page-group before processing continues with the next block. This structure differs from prior art systems in which background health checking is performed across multiple blocks before processing of any one block is completed. In doing so, background health checking of an entire or partial block can be supported by dedicated hardware, which can report per-page bit error counts, per-page-group bit error counts and/or a maximum per-page bit error count for the block. At the same time, processing one entire block at a time minimizes the statistical information that must be maintained during any given iteration of background health checker 930.

At block 1008, background health checker 930 reads health-related parameters of the block, which may be stored, for example, in PSI 502, flash controller memory 142, and/or GPP memory 134. The health-related parameters can include, for example, read threshold voltage shift values that specify the voltage shift(s) from the nominal voltage thresholds utilized to represent different data values in the cells of a page group. In addition, the health-related parameters can include the error count margin, which is a configurable threshold that can be expressed as a fixed percentage of bit errors in excess of the current maximum per-page-group bit error count found with the block. As will be appreciated, the health-related parameters may include further parameters, such as a read disturb count value indicating a number of read disturbs either per-page group and/or a maximum per-page-group read disturb count value over the block or program/erase cycles since the block has been last calibrated.

At block 1010, background health checker 930 performs a page group read sweep test over the selected page group. For example, in one exemplary embodiment, flash controller 140 reads all physical pages in the page group with the current read threshold voltage shift values accessed at block 1008 and determines and records the number of bit errors per codeword, per-page and over the page group. In the normal case, all pages of the page group are successfully read. Exceptionally, one or more pages can no longer be read (i.e., contain too many errors such that one or more codewords are uncorrectable). In this case, background health checker 930 terminates the background health checking process for the current block stripe and queues the block stripe for relocation by placing an identifier of the block stripe in relocation queue 904. Note that the individual page read operations can be scheduled in predetermined time intervals (not shown) such that the background health checker 930 does not impact host IOPs and in the end the entire NAND flash memory system 150 can be traversed in a predefined time interval (e.g., 1 week).

At block 1011, background health checker 930 additionally determines if any block in the block stripe requires calibration and/or the end of calibration interval has been reached for the currently selected page group or block, for example, by determining whether a calibration time interval (e.g., one week) has elapsed and/or a number of bit errors detected in the page group (or a page in the page group)

during the read sweep performed at block 1010 has exceeded a first calibration threshold and/or increased by more than a second calibration threshold and/or the block had been marked explicitly for calibration. In response to a determination at block 1011 that calibration is not required, the process passes to block 1015, which depicts background health checker 930 determining whether the bit errors for the page group exceeds a relocation threshold. In response to the relocation threshold being exceeded, background health checker 930 places the block stripe on relocation queue 904 (block 1017) and may downgrade the health grade of the block. Background health checker 930 further selects the next valid block stripe in block 1018 and continues its processing at block 1004 as described above. If, however, background health checker 930 determines at block 1011 that calibration is required, the process passes to a page group calibration step at block 1012. It should be noted that in some embodiments of the disclosed process, the read sweep test depicted at block 1010 and the page group calibration step illustrated at block 1012 are performed at the same intervals; in other embodiments like that illustrated in FIG. 10A, page group calibration can be performed at a longer interval than the read sweep test.

As noted above, block 1012 illustrates background health checker 930 performing a page group calibration in which background health checker 930 determines a preferred read threshold voltage shift value for the current page group. For example, in one embodiment, background health checker 930 performs the page group calibration by instructing the flash controller 140 to read data from one or more pages of the page group using at least one read voltage threshold shift value that is higher than the current read voltage threshold shift value and at least one read voltage threshold shift value that is lower than the current read voltage threshold. As noted below, background health checker 930 records (e.g., in GPP memory 134) the read threshold voltage shift value that produced the lowest number of errors during calibration as the preferred read threshold voltage shift value for the page group and marks the page group as calibrated in the block statistics. Similarly as in the read sweep test performed at block 1010, the individual page read operations for calibration can be scheduled in predetermined time intervals (not shown) such that background health checker 930 does not impact host IOPs and in the end the entire NAND flash memory system 150 can be traversed in a predefined time interval (e.g., 1 week).

In at least some embodiments, background health checker 930 supports multiple different levels of calibration, including:
  Fast calibration: Reads only a limited number of sample pages in the page group utilizing multiple (e.g., 2-5) different read threshold voltage shift levels;
  Normal calibration: Reads all pages in the page group utilizing multiple (e.g., 2-5) different read threshold voltage shift levels; and
  Extensive calibration: Reads all pages in the page group utilizing a large set of different read threshold voltage shift values (up to all possible values).

In the embodiments supporting multiple levels of calibration, background health checker 930 preferably reduces the system resources consumed by background health checking by generally performing fast calibration and then performing normal calibration at longer intervals, such as every four weeks. Further, background health checker 930 can determine the level of calibration to employ at block 1012 based on the results of the read sweep at block 1010 and/or based on bit errors detected while servicing host read IOPs and/or other health related meta-data maintained by the management code running on GPP 132, for example, by employing normal calibration if the number of bit errors detected exceeds a first calibration selection threshold, employing extensive calibration if the number of bit error detected exceeds a greater second calibration selection threshold, and otherwise employing fast calibration. In response to the calibration not resulting in update of the read threshold shift value and the bit errors for the page group exceeding a relocation threshold in block 1013, background health checker 930 can also place a block stripe on relocation queue 904 in block 1017 and downgrade the health grade of the block. Background health checker 930 then selects the next valid block stripe in block 1018 and continues processing at block 1004. The selection of the next valid block stripe in block 1018 can take a predetermined time interval, such that the background health checker 930 does not impact host IOPs and in the end the entire NAND flash memory system 150 can be traversed in a predefined time interval (e.g., 1 week).

It should be noted that because the read sweep performed at block 1010 is also performed on a page group basis, there is no need to again perform reads over the page group using the current read voltage threshold shift value at block 1012. Thus, by performing read sweep testing and page group calibration in a unified (merged) process, additional efficiency is achieved.

In response to a determination at block 1013 that the bit errors for the page group do not exceed a relocation threshold, the process proceeds to block 1014. At block 1014, background health checker 930 determines whether or not all page groups within the currently selected block have been processed. If not, background health checker 930 selects a next page group for processing at block 1016, and the process returns to block 1010, which has been described. If, however, background health checker 930 determines at block 1014 that all page groups in the currently selected block have been processed, the process passes to block 1020, which illustrates background health checker 930 updating the block health metric for the block in GPP memory 134. The block health metric can be based on, for example, the maximum per-page bit error count found for any individual page in the block and/or one or more additional health-related factors. At block 1022, background health checker 930 computes and updates the error count margin for the block, which as noted above, can be implemented as an error count that is a given percentage above (e.g., 10% or 20%) the current maximum per-page bit error count for the block. In a preferred embodiment, the error count margin is capped below the block retirement error count limit, which would cause the block to be retired by block retirement function 918. In addition, at block 1024 background health checker 930 stores the updated block parameters for the block, for example, in flash controller memory 142 and/or PSI 502.

Figure 12:
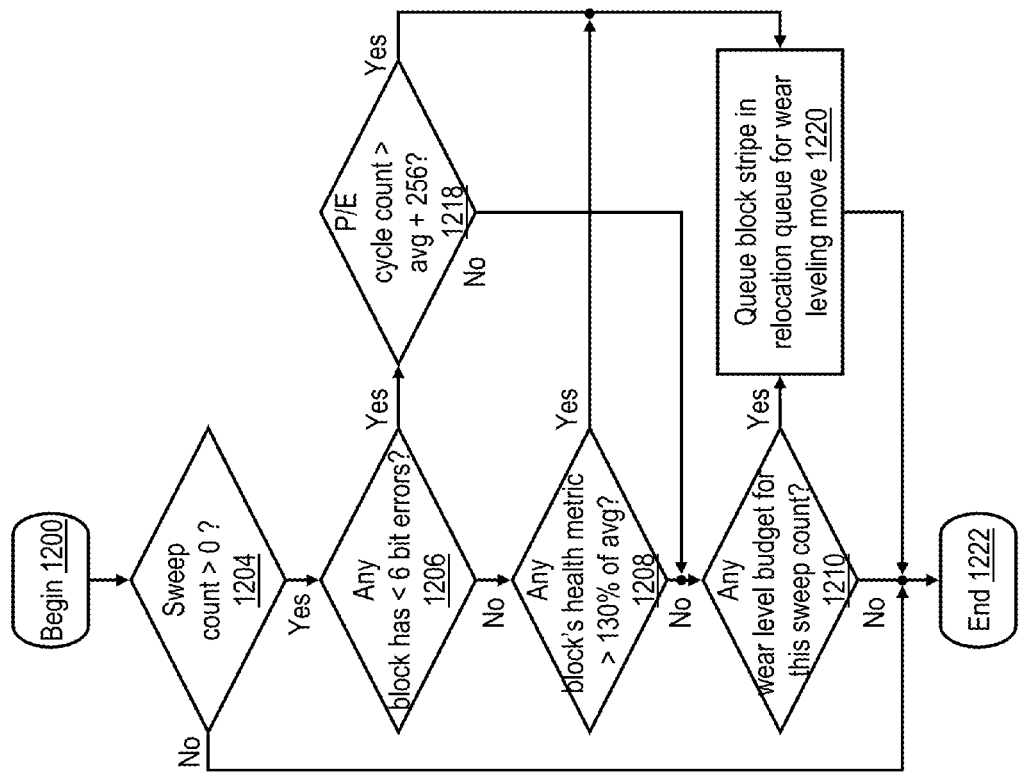
FIG. 12 is a high level logical flowchart of an exemplary process by which a flash controller performs wear leveling in accordance with one embodiment.

Following block 1024, the process proceeds through page connector C to block 1026 of FIG. 10B, which illustrates background health checker 930 performing wear leveling for this block stripe, if needed, to more evenly distribute the wear of program/erase cycles across blocks. One exemplary method of wear leveling is illustrated in FIG. 12, which is described in detail below. The execution of wear leveling could also be done in a separate background process or at the end of performing health grade updates in block 1034 (described below), but is preferably executed at this point in the process as it reduces the system resources for flash management by generally performing wear leveling based on the results of the read sweep at block 1010 and/or based on the page group calibration at block 1012 such that no additional reads of block data need to be performed. Background health checker 930 then determines at block 1030 whether all blocks in the currently selected block stripe have been processed. If so, the process passes to block 1032, which is described below. If not, background health checker 930 selects the next valid block in the block stripe (block 1038), increments the block stripe sweep count, and then returns through page connector B to block 1006 of FIG. 10A, which has been described.

Block 1032 of FIG. 10B illustrates flash controller 140 determining whether or not all block stripes in NAND flash memory system 150 have been processed. If not, background health checker 930 selects the next valid block stripe (block 1040) and returns through page connector A to block 1004 of FIG. 10A, which has been described. Note that the selection of the next valid block stripe at block 1040 can take a predetermined time interval, such that background health checker 930 does not impact host IOPs and in the end the entire NAND flash memory system 150 can be traversed in a predefined time interval (e.g., 1 week). In response to determining at block 1032 that all block stripes have been processed, the process of FIG. 10B proceeds to block 1034.

Block 1034 illustrates background health checker 930 updating the health grade of each block. One exemplary method of updating the health grade of each block is illustrated in FIG. 11, which is described in detail below. In addition, at block 1036, background health checker 930 updates wear leveling statistics, for example, by determining the number of wear leveling moves that can be issued for different characteristics in the next health iteration as will be described in more detail in FIG. 12 below. Here again, the background health checker 930 preferably reduces the system resources consumed by background health checking by generally performing health grading based on the results of the read sweep at block 1010, and/or based on the page group calibration at block 1012 such that no additional reads of block data need to be performed, and based on the block health metric update at block 1020. Thereafter, the process of FIGS. 10A-10B ends at block 1040 until a next scheduled iteration of background health checker 930.

With reference now to FIG. 11, there is illustrated a high level logical flowchart of an exemplary process by which background health checker 930 updates the health grade of blocks of storage in NAND flash memory system 150 in accordance with one embodiment. The process shown in FIG. 11 begins at block 1100 and proceeds to block 1102, which illustrates background health checker 930 establishing new health grade thresholds for each of multiple (e.g., four to eight) health grades of non-retired blocks. In one exemplary embodiment, background health checker 930 employs four health grades and establishes the health grade thresholds for the block health metric such that:

- 40% of the healthiest blocks according to the block health metric are classified as grade 0;
- 30% of the next most healthy blocks according to the block health metric are classified as grade 1,
- 20% of the next most healthy blocks according to the block health metric are classified as grade 2, and
- 10% of the least healthy blocks according to the block health metric are classified as grade 3.

These health grade thresholds are chosen to coarsely reflect the expected skewness of the workload of NAND flash memory system 150. For example, the healthiest grade, grade 0, includes the largest percentage of blocks since this grade absorbs most of the write IOPs. Simulations have empirically found that these health grade thresholds work well with various levels of skewness in workloads.

At block 1104, background health checker 930 then updates the block metadata (e.g., in GPP memory 134 or flash controller memory 142) of each non-retired, occupied block of NAND flash memory system 150 with a new health grade based on the current block health metric of the block and the health grade thresholds established at block 1102. It should be noted that because the block grading performed at block 1104 leverages the results of previously performed reads of block data, the block grading does not require any additional reads of block data to be performed, meaning that all non-retired blocks in NAND flash memory system 150 including those in the RTU queues 906 can be graded in a fast and efficient manner. In connection with the block grading at block 1104, background health checker 930 preferably also computes and stores additional health statistics, such as the average health metric of each block stripe and the average program/erase (P/E) cycle count of the blocks in the block stripe.

At block 1106, flash controller 140 also processes RTU queues 906 to update the affiliation of erased blocks with a new health grade to their correct RTU queue 906. Because build block stripes function 920 preferably builds block stripes based in part on the health grade of erased blocks, relatively unhealthy blocks may remain enqueued in RTU queues 906 for some time and may thus become increasingly healthy relative to occupied blocks. If blocks on RTU queues 906 were not processed at block 1106 to be placed on the correct RTU queue, blocks would likely remain unused on RTU queues 906 for longer than is desirable if a relatively equal block health is to be maintained across NAND flash memory system 150.

Following block 1106, flash controller resets the health checking flags and counters updated in the present iteration of the background health checking process. Thereafter, the process of FIG. 11 terminates at block 1110.

Referring now to FIG. 12, there is depicted a high level logical flowchart of an exemplary process by which a background health checker 930 performs wear leveling in accordance with one embodiment. The process of FIG. 12 begins at block 1200 and then determines at block 1204 whether or not the sweep count of the block stripe is larger than zero. In case the sweep count is not larger than zero, the block stripe has been recently written, and no wear leveling is performed on the selected block stripe in order to avoid subjecting it to an unnecessary P/E cycle. Consequently, the wear leveling process passes directly to block 1222, which ends wear leveling of the block stripe.

Returning to block 1204, if background health checker 930 determines that the sweep count is greater than the zero, background health checker 930 additionally determines at block 1206 whether any block of the block stripe has a bit error count as determined during the read sweep performed at block 1010 and/or the calibration at block 1012 of FIG. 10A that is less than a wear leveling threshold, such as six. If so, background health checker 930 further determines at block 1218 whether or not the P/E cycle count of any block in the block stripe exceeds the average P/E cycle count of the block stripe by a cycle count threshold, such as 256. If not, the process proceeds to block 1208, which is described below. If, however, background health checker 930 determines at block 1218 that the P/E cycle count of any block in the block stripe exceeds the average P/E cycle count of the block stripe by a cycle count threshold, the process passes to block 1220, which depicts background health checker 930 queuing the block stripe in relocation queue 904 for relocation for wear leveling purposes. Following block 1220, the process passes to block 1222, which ends wear leveling of the block stripe.

Referring now to block 1208, background health checker 930 determines if any block of the block stripe has a health metric value that exceeds a health metric threshold, such as 130% of the average health metric of the block stripe. If so, then the process proceeds to block 1220, which has been described. If, however, background health checker 930 determines at block 1208 that no block of the block stripe has a health metric value that exceeds the health metric threshold, background health checker 930 further determines at block 1210 whether or not background health checker 930 has any budgeted wear leveling relocations remaining during the current background health checking iteration for the sweep count of the block stripe. In at least one embodiment, for each iteration of the background health checking process of FIGS. 10A-10B, background health checker 930 budgets a predetermined number of additional wear leveling relocations of block stripes for each of multiple ranges of block stripe sweep counts, as noted above with reference to block 1036 of FIG. 10B. As will be appreciated, background health checker 930 preferably devotes the large majority of its wear leveling relocation budget to the oldest block stripes in the occupied block queues, hence the ranges corresponding to higher sweep count values. If any wear leveling relocations remain for the range of sweep count values into which the sweep count of the selected block stripe falls, then the process passes from block 1210 to block 1220, which has been described. If, however, background health checker 930 makes a negative determination at block 1210, the wear leveling process of FIG. 12 ends at block 1222.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, in at least one embodiment, a controller of a non-volatile memory array, such as a flash memory array, iteratively performs a merged background management process independently of any host system's demand requests targeting the memory array. During an iteration of the merged background management process, the controller performs a read sweep by reading data from each of a plurality of page groups within the memory array and recording page group error statistics regarding errors detected by the reading for each page group, where each page group is formed of a respective set of one or more physical pages of storage in the memory array. During the iteration of the merged background management process, the controller employs the page group error statistics recorded during the read sweep in another background management function.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method in a data storage system including a non-volatile memory array controlled by a controller, the method comprising:

the controller iteratively performing a merged background management process;

during an iteration of the merged background management process, the controller performing a read sweep by reading data from each of a plurality of page groups within the memory array and recording page group error statistics regarding errors detected by the reading for each page group, wherein each page group is formed of a respective set of one or more physical pages of storage in the memory array; and during the iteration of the merged background management process, the controller employing the page group error statistics recorded during the read sweep in another background management function.

2. The method of claim 1, wherein said another background management function is a calibration of a read voltage for a page group.

3. The method of claim 2, wherein employing the page group error statistics recorded during the read sweep in another background management function includes determining whether to adjust a read threshold voltage shift for each of the plurality of page groups based at least in part on the page group error statistics recorded during the read sweep.

4. The method of claim 1, wherein said another background management function includes performing wear leveling on a plurality of blocks of physical storage in the memory array, wherein the plurality of blocks includes the plurality of page groups.

5. The method of claim 1, wherein said another background management function includes updating a health grade of a block of a physical storage in the memory array, wherein the block includes the plurality of page groups.

6. The method of claim 5, wherein the updating includes updating a respective health grade of each of a plurality of unused blocks of physical storage identified in a ready-to-use data structure that identifies blocks of physical storage available for storing data.

7. The method of claim 1, wherein the controller iteratively performing a merged background management process comprises the controller iteratively performing the merged background management process independently of any host system's demand requests targeting the memory array.

8. The method of claim 1, wherein recording page group error statistics comprises recording page group error statistics regarding errors in the memory array detected by the read sweep.

9. A data storage system, comprising:
a controller configured to be coupled to a non-volatile memory array, wherein the controller iteratively performs a merged background management process, wherein during an iteration of the merged background management process, the controller performs a read sweep by reading data from each of a plurality of page groups within the memory array and records page group error statistics regarding errors detected by the reading for each page group, wherein each page group is formed of a respective set of one or more physical pages of storage from a same memory block in the memory array, and wherein the controller, during the iteration of the merged background management process, employs the page group error statistics recorded during the read sweep in another background management function.

10. The data storage system of claim 9, wherein said another background management function is a calibration of a read voltage for a page group.

11. The data storage system of claim 10, wherein the controller employs the page group error statistics recorded during the read sweep in another background management function by determining whether to adjust a read threshold voltage shift for each of the plurality of page groups based at least in part on the page group error statistics recorded during the read sweep.

12. The data storage system of claim 9, wherein said another background management function comprises a wear leveling function performed on a plurality of blocks of physical storage in the memory array, wherein the plurality of blocks includes the plurality of page groups.

13. The data storage system of claim 9, wherein said another background management function comprises a health grade update of a block of a physical storage in the memory array, wherein the block includes the plurality of page groups.

14. The data storage system of claim 13, wherein:
the controller maintains a ready-to-use data structure that identifies blocks of physical storage available for storing data; and
the controller is configured to update a respective health grade of each a plurality of unused blocks of physical storage identified in the ready-to-use data structure.

15. The data storage system of claim 9, wherein the controller iteratively performs the merged background management process independently of any host system's demand requests targeting the memory array.

16. The data storage system of claim 9, further comprising the non-volatile memory array coupled to the controller.

17. The data storage system of claim 9, wherein the page group error statistics comprise page group error statistics regarding errors in the memory array detected by the read sweep.

18. A program product, comprising:
a storage device; and
program code stored in the storage device, wherein the program code, when executed by a controller that controls a non-volatile memory array of a data storage system, causes the controller to perform:
iteratively performing a merged background management process;
during an iteration of the merged background management process, performing a read sweep by reading data from each of a plurality of page groups within the memory array and recording page group error statistics regarding errors detected by the reading for each page group, wherein each page group is formed of a respective set of one or more physical pages of storage in the memory array; and
during the iteration of the merged background management process, employing the page group error statistics recorded during the read sweep in another background management function.

19. The program product of claim 18, wherein said another background management function is a calibration of a read voltage for a page group.

20. The program product of claim 19, wherein employing the page group error statistics recorded during the read sweep in another background management function includes determining whether to adjust a read threshold voltage shift for each of the plurality of page groups based at least in part on the page group error statistics recorded during the read sweep.

21. The program product of claim 18, wherein said another background management function includes performing wear leveling on a plurality of blocks of physical storage in the memory array, wherein the plurality of blocks includes the plurality of page groups.

22. The program product of claim 18, wherein said another background management function includes updating a health grade of a block of a physical storage in the memory array, wherein the block includes the plurality of page groups.

23. The program product of claim 22, wherein the updating includes updating a respective health grade of each of a plurality of unused blocks of physical storage identified in a ready-to-use data structure that identifies blocks of physical storage available for storing data.

24. The program product of claim 18, wherein the controller iteratively performing a merged background management process comprises the controller iteratively performing the merged background management process independently of any host system's demand requests targeting the memory array.

25. The program product of claim 18, wherein recording page group error statistics comprises recording page group error statistics regarding errors in the memory array detected by the read sweep.

* * * * *